A. R. THOMPSON.
TIRE MOLD.
APPLICATION FILED MAR. 27, 1919.
1,354,227.
Patented Sept. 28, 1920.
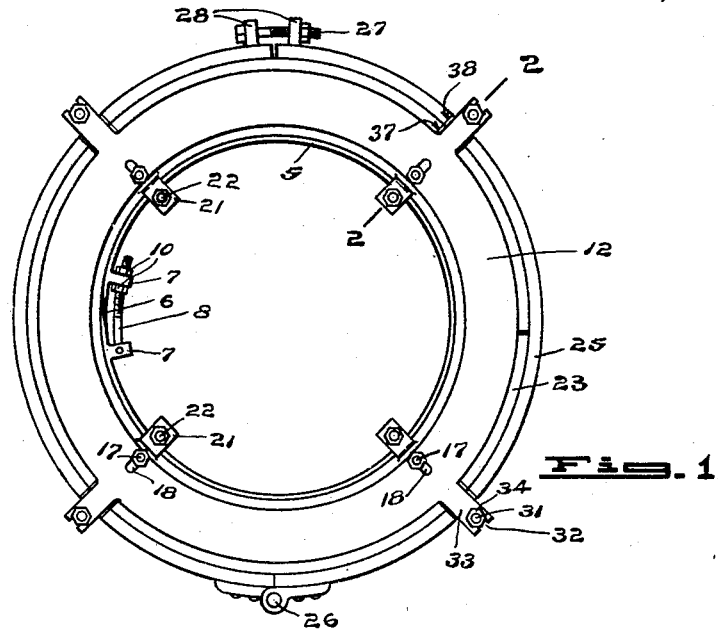
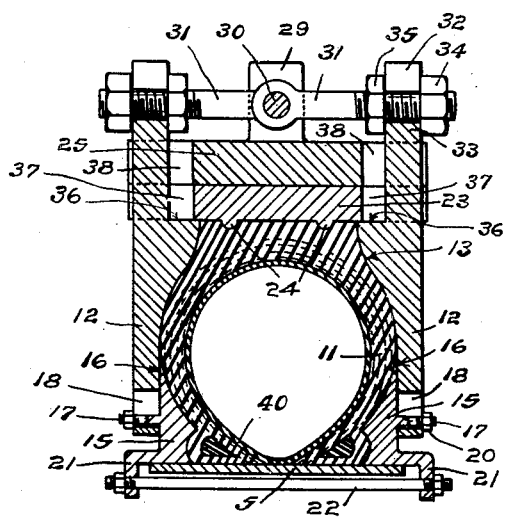
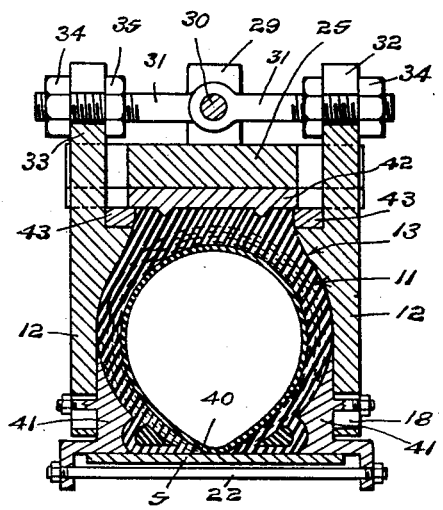
Inventor
Albert R. Thompson
By His Attorney
Horace Barnes

UNITED STATES PATENT OFFICE.

ALBERT R. THOMPSON, OF TACOMA, WASHINGTON.

TIRE-MOLD.

1,354,227.  Specification of Letters Patent.  Patented Sept. 28, 1920.

Application filed March 27, 1919. Serial No. 285,502.

*To all whom it may concern:*

Be it known that I, ALBERT R. THOMPSON, a citizen of the United States, and resident of Tacoma, in the county of Pierce and State of Washington, have invented certain new and useful Improvements in Tire-Molds, of which the following is an exact and clear specification.

This invention relates to improvements in tire molds and the object of this improvement is to provide a tire mold of simple and efficient form of construction that is particularly well adapted for rebuilding old tires and that may be adjusted to fit tires that have become permanently enlarged or stretched by use.

A further object is to provide a tire mold that may be quickly and easily assembled and taken apart and to provide a mold that will make a tire that is free from external ridges and blemishes.

A still further object is to provide a tire mold having a pair of side plates and having a tread band that fits over the peripheral edges of the side plates so that the side plates may be adjusted laterally within the tread band.

In the accompanying drawings Figure 1 is a view in elevation of an assembled tire mold constructed in accordance with this invention; Fig. 2 is an enlarged view in cross section substantially on broken line 2—2 of Fig. 1 and Fig. 3 is a view similar to Fig. 2 showing the mold adjusted to fit a tire that has been enlarged by use.

Like reference numerals designate like parts throughout the several views.

Referring to the drawings the numeral 5 designates a rim band that is formed with tapered, overlapping ends 6 upon each of which ends are provided inwardly directed lugs 7 through which extend bolts 8 that are provided with nuts 10 which may be adjusted to expand or contract the rim band 5 to conform to the internal diameter of a tire 11.

12 are side plates which are of identical construction and form the two side walls of the mold. The inner surfaces of the side walls are shaped to conform to the exterior curvature of the sides of the tire and are preferably curved inwardly adjacent the tread portion of the tire as indicated at 13.

The external walls of the tire adjacent the bead thereof are supported by bead rings 15 which are substantially identical for the two sides of the tire and are of any suitable curvature to conform to the curvature of the particular tire that is being molded. The outer side of each bead ring is flat so that it will rest squarely against the flat inner surface of the adjacent side plate 12 and the peripheral portion of each bead ring is tapered to a sharp edge as indicated at 16 which rests against the inner face of the adjacent side plate in such a manner as to form a substantially smooth surface that will not ridge the side of the tire that is being molded.

The bead rings 15 are each provided at a plurality of spaced intervals with outwardly directed stud bolts 17 that project through slots 18 in the side plates 12 and have nuts 20 screwed thereon to secure the bead rings to the side plates. The bead rings 15 are adapted to fit over the rim band 5 and are provided at intervals with rigid angle brackets 21 that project sidewise therefrom and thence inwardly radially of the mold as shown in Figs. 2 and 3. The brackets 21 on the oppositely disposed bead rings are secured together by transverse bolts 22, sufficient clearance being allowed between the edges of the rim band 5 and the brackets 21 to permit the bead rings 15 and inner edges of the side plates 12 to be adjusted toward and away from each other.

23 is an annular tread rim that may be in the form of a solid ring or that may be a split ring as shown in the drawings and which is adapted to fit over the outer peripheries of the side plates 12 and serve as a retaining wall for the tread portion of the tire. If desired the inner surface of the tread rim 23 may be provided with two annular ridges 24 that form annular grooves in the tread of the tire or such tread rim may have inwardly directed projections of any other form to give to the tire tread the desired non-skid surface.

If the tread rim is made in the form of a split ring as shown in the drawings, it may be expanded circumferentially, thereby facilitating placing the same on a tire.

The tread rim is arranged to fit within an annular mold case or retaining ring 25 that is preferably formed in two halves which are connected at one point by a hinge 26, as shown in Fig. 1, and are adjustably secured together at an opposite point by a bolt 27 that passes through two integral lugs 28 formed adjacent the two ends respectively of the retaining ring that are opposite the hinges.

The retaining ring 25 is provided at a plurality of intervals with pairs of outwardly directed, spaced apart lugs 29 each of which pairs has a pin 30 projecting therethrough upon which are mounted two oppositely directed bolts 31. The bolts 31 are arranged to project through slots 32 in lugs 33 that are provided on the peripheries, of the side plates 12 and each have nuts 34 and 35 arranged to screw against the opposite sides of the lugs 33 in such manner that the outer portions of the side plates may be adjusted toward and away from each other.

The brackets 33 are of less thickness than the thickened portions 13 of the side plates so that shoulders 36 are formed, the shoulders 36 being a portion of the periphery of the side plates.

The tread rim 23 and retaining ring 25 are notched on their edges as indicated at 37 and 38 respectively, to afford recesses through which the lugs 33 may pass.

If the tire that is to be molded is of standard size and has not been stretched it may be built up in the usual manner and placed in the mold with an air bag 40 disposed in the inside thereof. The various parts of the mold may then be adjusted to fit the tire in the desired manner, the air bag 40 inflated to the correct pressure and the mold subjected to heat for a sufficient length of time to cure the tire.

If the tire that is being rebuilt has become permanently enlarged or stretched as shown in Fig. 3 the rim band 5 may be expanded to fit snugly within the tire, bead rings 41 of larger size than the bead rings 15 but of otherwise identical construction may be substituted for the rings 15, a tread band 42 of less thickness and larger internal diameter than the tread band 23 may be placed on the tread portion of the tire and the retaining ring 25 and side walls 12 may be adjusted to fit the tire in the manner hereinbefore described. When the tread rim 42 of larger internal diameter is used it is obvious that a space will be left between such tread rim and the periphery of the side walls 12 and for the purpose of closing this space I provide two rings 43 that are adapted to fit the periphery of the side plates 12 and rest on the shoulders 36 formed by the lugs 33, the lugs serving to prevent sidewise displacement of the rings 43 and the rings constituting a continuation of the inner curved surfaces 13 of the side plates 12.

By the form of construction just described it will be seen that by substituting bead rings and tread rims of larger size and providing the additional rings 43 for fillers this mold may be used in rebuilding tires that have become permanently stretched or enlarged.

It will also be seen that when the side plates are used either with or without the extension rings 43 such side plates are arranged to fit within their respective rim bands and may be adjusted toward and away from each other, the nuts 35 serving as adjustable stops to limit the inward movement of the side plates.

It is obvious that changes in the precise form of construction of the various parts of this tire mold may be resorted to within the scope of the claims.

What I claim and desire to protect by Letters Patent, is—

1. In a tire mold, a tread rim, side plates arranged for adjustment laterally within said rim, and a bead rim arranged to be adjustably secured to each said side plate.

2. In a tire mold, an annular tread rim, side plates arranged to fit within said rim and adjustable laterally thereof, a bead rim adjustably secured to each said side plate, and an expansible band within said beam rims.

3. In a tire mold, a tread rim, side plates arranged to fit within each side of said rim, and screw devices connected with said rim for drawing said plates together.

4. In a tire mold, an annular tread rim, side plates upon each side of said rim movable in lateral directions, and pressure applying apparatus connecting said plates through said rim for drawing said plates together.

5. In a tire mold an annular tread rim, side plates upon each side of said rim and movable in lateral directions screw threaded bolts connected with said tread rim for securing the side plates in adjusted positions, and adjustable stops on said bolts to limit the inward movement of said side plates.

6. In a tire mold of the class described, a pair of side plates, lugs projecting outwardly from the peripheries of said side plates, a tread rim arranged to fit over the peripheries of said side plates said tread rim being notched to fit said lugs, threaded bolts connected with said lugs for adjustably securing said side plates within said tread rim and stop nuts adjustable on said threaded bolts to limit the inward movement of said side plates.

7. A tire mold comprising an expansible rim band, bead rings arranged to fit over said rim band, side plates secured to said bead rings, a tread rim arranged to rest upon the peripheral portion of said side plates, a retaining ring surrounding said tread rim, and means for securing the outer edges of said side plates together.

8. A tire mold comprising a rim band, bead rings arranged to fit over the opposite edges of said rim band, adjustable means for securing said bead rings together whereby they may be moved toward and away from each other, side plates arranged to be secured at their inner edges to said bead rings, a tread rim arranged to fit over the peripheries of said side plates, means for sustaining said tread rim against expansion and adjustable means for securing the peripheral portions of said side plates together.

9. A tire mold comprising a rim band, bead rings arranged to fit over the opposite edges of said rim band, adjustable means for securing said bead rings together whereby they may be moved toward and away from each other, side plates having interior surfaces that conform to the configuration of a tire and having slots adjacent the inner edges thereof, stud bolts rigid on said bead rings and arranged to project outwardly through said slots whereby said bead rings and said side plates may be secured together, a tread rim arranged to encircle said side plates, a contractible retaining ring for said tread rim and adjustable means connected with said retaining ring for securing the peripheral portions of said side plates together.

10. An adjustable tire mold comprising an expansible rim band, sets of bead rings arranged to fit said rim band when said rim band is adjusted to different sizes, side plates having radially arranged slots adjacent their inner edges, stud bolts on said bead rings said stud bolts being arranged to project outwardly through said slots whereby said bead rings may be secured to said side plates, means for adjustably securing the bead rings on opposite sides of said rim band together, tread rims of various sizes arranged to fit over the peripheral portions of said side plates, filler rings adapted to be interposed between said tread rims and the peripheries of said side plates, an adjustable retaining ring for said tread rim, and means for adjustably securing the peripheral portions of said side plates together.

11. A tire mold of the class described comprising an expansible rim band, bead rings arranged to fit said rim band the inner surfaces of said bead rings being shaped to conform to the shape of the bead portion of a tire, angular bracket members projecting inwardly from said bead rings, bolts adjustably connecting corresponding brackets on oppositely disposed bead rings, annular side plates having inner surfaces that are shaped to conform to the shape of the side of a tire, the inner edges of said side plates having radially disposed slots provided therein, stud bolts integral with said bead rings and arranged to project outwardly through said slots in said side plates whereby said bead rings may be secured to said side plates, lugs projecting outwardly from the peripheral edges of said side plates, an annular split ring tread rim arranged to fit over the peripheries of said side plates said tread rim being notched to fit over the lugs on said side plates, an adjustable retaining ring extending around said tread rim, outwardly directed lugs on said retaining ring, and bolts pivoted to said lugs on said retaining ring and adjustably connected with said lugs on said side plates for adjustably supporting the peripheral edges of said side plates.

12. A tire mold of the class described comprising an expansible rim band, sets of bead rings of various sizes arranged to fit said rim band, angular bracket members projecting outwardly and thence inwardly from said bead rings, means extending crosswise of said rim band for adjustably securing corresponding bracket members together, annular side plates having radial slots adjacent the inner edges thereof, stud bolts rigid with said bead rings and arranged to project outwardly through said slots for securing said side plates to said bead rings, lugs projecting outwardly from the peripheral edges of said side plates, tread rims of different size arranged to fit over the peripheries of said side plates, said tread rims being notched to fit over the lugs on said side plates, filler rings adapted to be interposed between said tread rims of larger diameter and the peripheries of said side plates, an adjustable retaining rim extending around said tread rim, outwardly directed lugs on said retaining ring and the bolts pivoted to said lugs on said retaining ring and adjustably connected with said lugs on said side plates.

Signed at Seattle, Washington, this 18th day of March, 1919.

ALBERT R. THOMPSON.